US010538410B2

(12) United States Patent
Moore (10) Patent No.: US 10,538,410 B2
(45) Date of Patent: Jan. 21, 2020

(54) COILED WIRE WINDING SPOOL WITH SELF-CENTERING REMOVABLE ENDFORM ASSEMBLY

(71) Applicant: REELEX Packaging Solutions, Inc., Patterson, NY (US)

(72) Inventor: Brian Moore, Wallkill, NY (US)

(73) Assignee: REELEX Packaging Solutions, Inc., Patterson, NY (US)

(*) Notice: Subject to any disclaimer, the term of this patent is extended or adjusted under 35 U.S.C. 154(b) by 74 days.

(21) Appl. No.: 15/913,082

(22) Filed: Mar. 6, 2018

(65) Prior Publication Data

US 2019/0276265 A1    Sep. 12, 2019

(51) Int. Cl.
| | |
|---|---|
| *B65H 75/22* | (2006.01) |
| *B65H 75/18* | (2006.01) |
| *B65H 54/02* | (2006.01) |
| *B65H 75/14* | (2006.01) |
| *B65H 54/58* | (2006.01) |
| *B65H 55/04* | (2006.01) |

(52) U.S. Cl.
CPC ............ *B65H 75/22* (2013.01); *B65H 54/02* (2013.01); *B65H 54/58* (2013.01); *B65H 75/14* (2013.01); *B65H 75/185* (2013.01); *B65H 55/046* (2013.01); *B65H 2701/36* (2013.01)

(58) Field of Classification Search
CPC ...... B65H 75/14; B65H 75/185; B65H 75/22; B65H 2701/36; B65H 55/046; B65H 54/58; B21C 47/12; B21C 47/30
See application file for complete search history.

(56) References Cited

U.S. PATENT DOCUMENTS

| | | | |
|---|---|---|---|
| 2,888,214 | A | 5/1959 | Wilke |
| 4,377,262 | A | 3/1983 | Zajac |
| 4,477,033 | A | 10/1984 | Kotzur et al. |
| 2016/0001906 | A1 | 1/2016 | Weissbrod |
| 2016/0311640 | A1 | 10/2016 | Moore |
| 2018/0273339 | A1 | 9/2018 | Kotzur |

OTHER PUBLICATIONS

RS1 REELEX Coiling Machine, REELEX Packaging Solutions, Inc., Oct. 21, 2013 [online] retrieved from <URL: https://www.youtube.com/watch?v=5AAFwY4Jp-M>.
International Search Report and Written Opinion of International Application No. PCT/US 19/20221 dated Apr. 30, 2019.

*Primary Examiner* — William E Dondero
(74) *Attorney, Agent, or Firm* — Gordon & Jacobson, P.C.

(57) ABSTRACT

A spool endform assembly includes an endform with a central collar that are configured to rotate about a rotational axis. The spool endform assembly further includes a mount sub-assembly configured to be mounted in a fixed orientation on a mounting structure (such as movable arm). The spool endform assembly is further configured to permit misalignment of the fixed orientation of the mount sub-assembly relative to the rotational axis of the endform and central collar. In embodiments, controlled movement of the mounting structure can be used to connect the spool endform assembly to a rotatable mandrel of a wire winding spool and disconnect the spool endform assembly from the rotatable mandrel. By permitting misalignment of the fixed orientation of the mount sub-assembly relative to the rotational axis of the endform and central collar, the spool endform assembly makes it easier to connect the spool endform assembly to the rotatable mandrel and to disconnect the spool endform assembly from the rotatable mandrel. Other features and aspects are described and/or claimed.

20 Claims, 6 Drawing Sheets

COILED WIRE WINDING SPOOL WITH SELF-CENTERING REMOVABLE ENDFORM ASSEMBLY

BACKGROUND

1. Field

The present disclosure relates to a spool for winding a coil of wire, and, more specifically, to a spool having a mandrel and a removable endform assembly.

2. State of the Art

Figure 1:
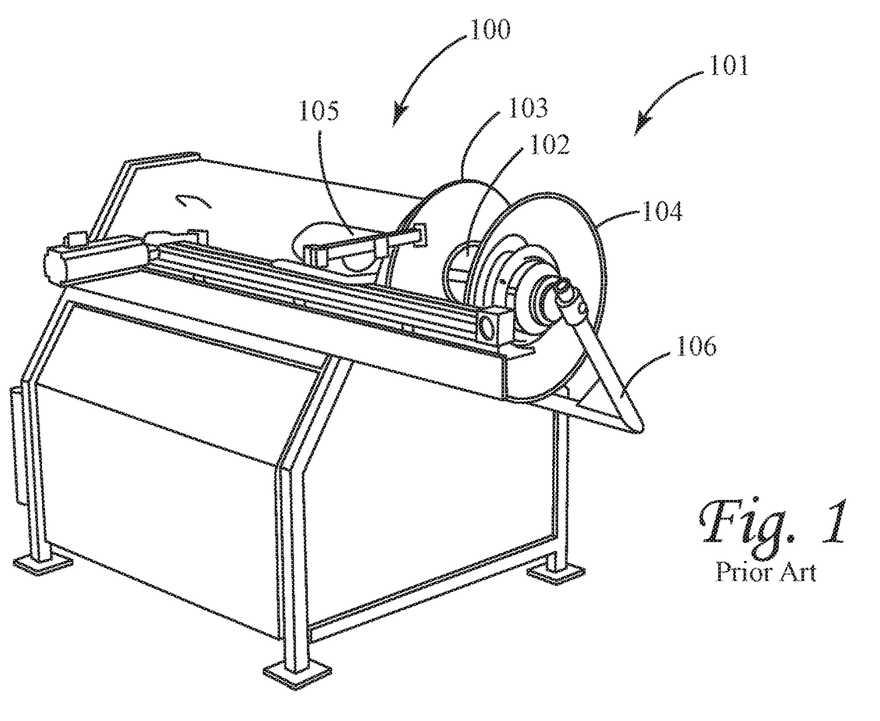
FIG. 1 shows a RS1 Variable-Traverse Coiling Machine which is available commercially from Reelex Packaging Solutions Inc. of Patterson, N.Y.

Coils of wire or cable (referred to herein as "wire") have been wound on winding machines, such as the RS1 Variable-Traverse Coiling Machine 100 shown in Prior Art FIG. 1, which is available commercially by Reelex Packaging Solutions Inc. of Patterson, N.Y. Such machines use a spool 101 having a mandrel 102 with endforms 103 and 104. The endform 104 is operably removably connected to the mandrel 102 and is connected to the machine 100 by a movable arm 106. To form a coil of wire, the machine 100 rotates the spool 101 about its longitudinal axis, while wire from a large supply of wire (not shown in FIG. 1) is wound about the mandrel 102. During this operation, the wire is guided by a moving traverse 105, which lays the wire onto the mandrel 102 at varying positions between the endforms 103 and 104. When a certain length of the wire is wound into a coil, the coil of wire is cut from the supply of wire and the spool 101 is opened at one end by disconnecting the endform 104 from the mandrel 102 to permit the coil or wire to be removed from the mandrel 102. After the coil of wire is removed from the mandrel 102, the machine 100 can then be reset to form a new coil by first using the arm 106 to move the endform 104 into axial alignment with the mandrel 102 and reconnecting the endform 104 back to the mandrel 102.

The axis of the endform 104 is fixed relative to the movable arm 106 and is not readily repositionable without making manual adjustments. However, over time, the position of the axis of the endform 104 can inadvertently move due to wear or damage such that endform 104 and the mandrel 102 can become axially misaligned when they are connected together. Such misalignment can cause excessive bearing wear and/or failure, leading to downtime of the machine for repair and/or adjustment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect, further details of which are described below, a spool endform assembly includes an endform with a central collar that are configured to rotate about a rotational axis. The spool endform assembly further includes a mount sub-assembly configured to be mounted in a fixed orientation on a mounting structure (such as movable arm). The spool endform assembly is further configured to permit misalignment of the fixed orientation of the mount sub-assembly relative to the rotational axis of the endform and central collar.

In embodiments, controlled movement of the mounting structure can be used to connect the spool endform assembly to a rotatable mandrel of a wire winding spool and disconnect the spool endform assembly from the rotatable mandrel. By permitting misalignment of the fixed orientation of the mount sub-assembly relative to the rotational axis of the endform and central collar, the spool endform assembly makes it easier to connect the spool endform assembly to the rotatable mandrel and to disconnect the spool endform assembly from the rotatable mandrel.

In embodiments, the central collar of the endform can be configured such that, when the spool endform assembly is connected to the rotatable mandrel of the wire winding spool, the central collar receives and engages the rotatable mandrel such that the endform and central collar rotate in unison with the mandrel.

In embodiments, the mount sub-assembly can include at least one annular member that is centered about a mounting axis corresponding to the fixed orientation of the mount sub-assembly. The at least one annular member can be configured to support and retain a circular plate in a manner that provides a range of radial displacement of the circular plate relative to the at least one annular member. The circular plate can be coupled by a connector sub-assembly to the endform and central collar. In this configuration, the range of radial displacement of the circular plate relative to the at least one annular member can permit misalignment of the fixed orientation of the mount sub-assembly relative to the rotational axis of the endform and central collar.

In embodiments, the circular plate can include a plurality of radial holes or passageways that each receive a pin and biasing member (such as a spring). In this configuration, the pins and biasing members are configured to maintain contact of the pins with a recess of the at least one annular member and urge alignment of the mounting axis with the rotational axis of the endform and central collar.

In embodiments, the circular plate can include a central bearing support shaft that extends from the circular plate toward the central collar for coupling to the central collar. The assembly can further include a bearing that is supported by the central bearing support shaft and well as a bearing housing that surrounds the bearing and mates to the central collar to support rotation of the bearing housing, central collar and endform about the rotational axis relative to the central bearing support shaft and the circular plate. Alternatively, the assembly can include an open bearing frame coupled to a bearing collar that capture the bearing and that mate to the central collar to support rotation of the bearing housing, central collar and endform about the rotational axis relative to the central bearing support shaft and the circular plate.

In embodiments, the endform can have a convex inner side facing the mandrel of the wire winding spool. The mounting structure may include a moveable arm, which is moveable relative to the wire winding spool.

According to other aspects, a rotatable wire winding spool and corresponding wire winding machine are provided with a mandrel extending longitudinally along a central axis from a first end to a second end, a first endform assembly connected to the first end of the mandrel, and a second endform assembly configured to removably connect to the second end of the mandrel. The second endform assembly includes an endform with a central collar that are configured to rotate about a rotational axis. The second endform assembly further includes a mount sub-assembly configured to be mounted in a fixed orientation on a mounting structure (such as movable arm). The second endform assembly can be further configured to permit misalignment of the fixed orientation of the mount sub-assembly relative to the rotational axis of the endform and central collar.

In embodiments, controlled movement of the mounting structure (e.g., movable arm) can be used to connect the second endform assembly to the mandrel of a rotatable winding spool and disconnect the second endform assembly from the mandrel. By permitting misalignment of the fixed orientation of the mount sub-assembly relative to the rotational axis of the endform and central collar, the second endform assembly makes it easier to connect the second endform assembly to the mandrel and to disconnect the second endform assembly from the mandrel.

In embodiments, the central collar of the endform can be configured such that, when the second endform assembly is connected to the mandrel of the rotatable wire winding spool, the central collar receives and engages the mandrel such that the endform and central collar rotate in unison with the mandrel.

BRIEF DESCRIPTION OF THE DRAWINGS

Prior Art

FIG. 3a shows an isometric view of a removable endform assembly of the spool of FIG. 2.

FIG. 3b is an exploded view of the removable endform assembly of FIG. 3a.

FIG. 5a shows an isometric view of another embodiment of a removable endform assembly, which can be a part of the spool shown in FIG. 2.

FIG. 5b is an exploded view of the removable endform assembly of FIG. 5a.

DETAILED DESCRIPTION OF THE PREFERRED EMBODIMENTS

Figure 2:
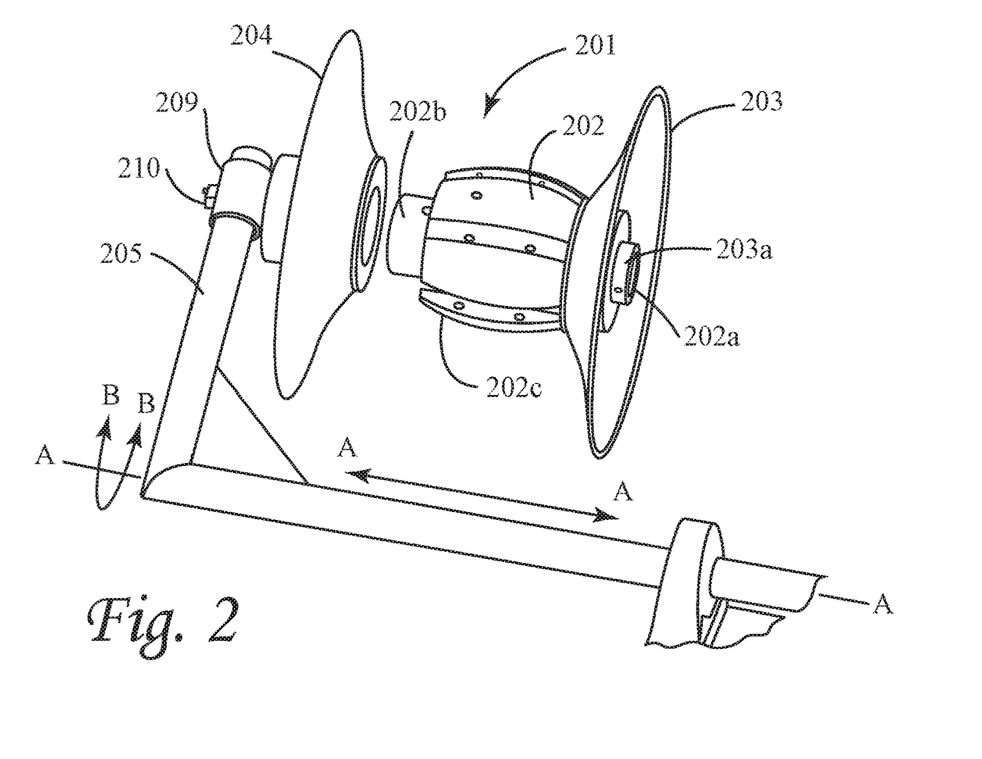
FIG. 2 illustrates a wire coiling spool in accordance with an aspect of this disclosure, which can substitute for the spool shown in FIG. 1.

FIG. 2 shows an embodiment of a wire coiling spool 201 in accordance with an aspect of the disclosure. The spool 201 can be used with the machine 100 shown in Prior Art FIG. 1 in place of spool 101. The spool 201 includes a mandrel 202, a first endform assembly 203 secured to a first end 202a of the mandrel 202, and a second endform assembly 204 removably connected to a second end 202b of the mandrel 202 opposite the first end 202a. The mandrel 202 and the first endform assembly 203 are rotatable about the central axis of the mandrel 202. The mandrel 202 includes a plurality of circumferentially spaced curved forms 202c, which extend between the endform assemblies 203 and 204 when they are connected to the mandrel 202. The second end 202b of the mandrel has a cylindrical shape and has an outer chamfered edge to guide the second end 202b into engagement with the second endform assembly 204. The second endform assembly 204 is configured to connect to the second end 202b of the mandrel 202 to wind wire on the spool 201 and is further configured to separate from the second end 202b of the mandrel 202 to unload a finished coil of wire from the mandrel 202, as described above in connection with the machine 100 in Prior Art FIG. 1. It should be noted that the alignment and connection of the second end 202b to the second endform assembly 204 can be performed manually or by automated means.

The first endform assembly 203 includes a hub 203a that is configured to connect to a driving shaft (not shown) of the winding machine, e.g., machine 100 in FIG. 1. Thus, the first endform assembly 203 and the mandrel 202 are secured to the rotatable driving shaft of the winding machine (e.g., machine 100) via the hub 203a and are not operably removable therefrom.

On the other hand, the second endform assembly 204 is removably connected to (and thus can be disconnected from) the mandrel 202 of the winding machine (e.g., machine 100) by operation of the movable arm 205. In particular, one end of the moveable arm 205 includes a mount collar 209 that connects the second endform assembly 204 to the moveable arm 205. The moveable arm 205 is axially translatable (bi-directionally in the direction of arrows A) and rotatable (bi-directionally in the direction of arrows B) about the axis A-A so that the second endform assembly 204 can be operably moved between two different operating positions. In a first position, the second endform assembly 204 is connected to the mandrel 202. In a second position, the second endform assembly 204 is disconnected from the mandrel 202. In the first position, the outer chamfered edge of the second end 202b of the mandrel 202 is received by and engages a cylindrical inner sleeve 212a of the second endform assembly 204 such that the mandrel 202 can drive rotation of the second endform assembly 204 with the rotation of the mandrel 202 and first endform assembly 203 during coil winding operations. When the coil winding operations are complete, the second endform assembly 204 can be moved into a second position where the second endform assembly 204 is disconnected from the mandrel 202 by translating the arm 205 axially (along the axial direction shown by the left hand arrow A in FIG. 2), which moves the second endform assembly 204 coupled to the mount collar 209 of the arm 205 axially parallel to axis A-A and away from the mandrel 202 and separates the mandrel 202 from the inner sleeve 212a of the second endform assembly 204. Furthermore, the entire second end form assembly 204 can be swung out of the way of the mandrel 202 by rotating the arm 205 about axis A-A so that a finished coil of wire (not shown) supported on the mandrel 202 can be unloaded by pulling the coil of wire axially parallel to axis A-A and away from the mandrel 202.

Figures 3A, 3B:
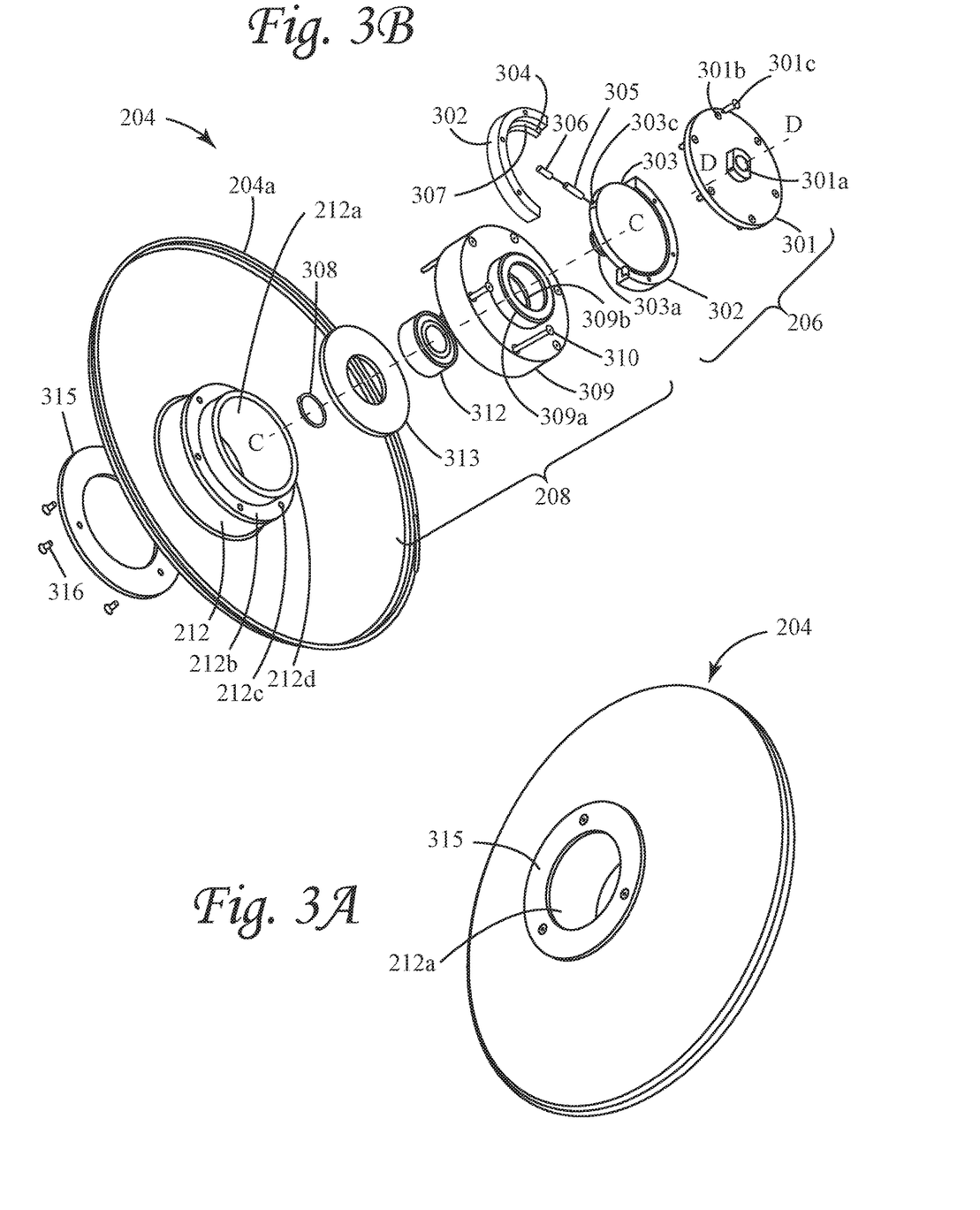
Figure 3C:
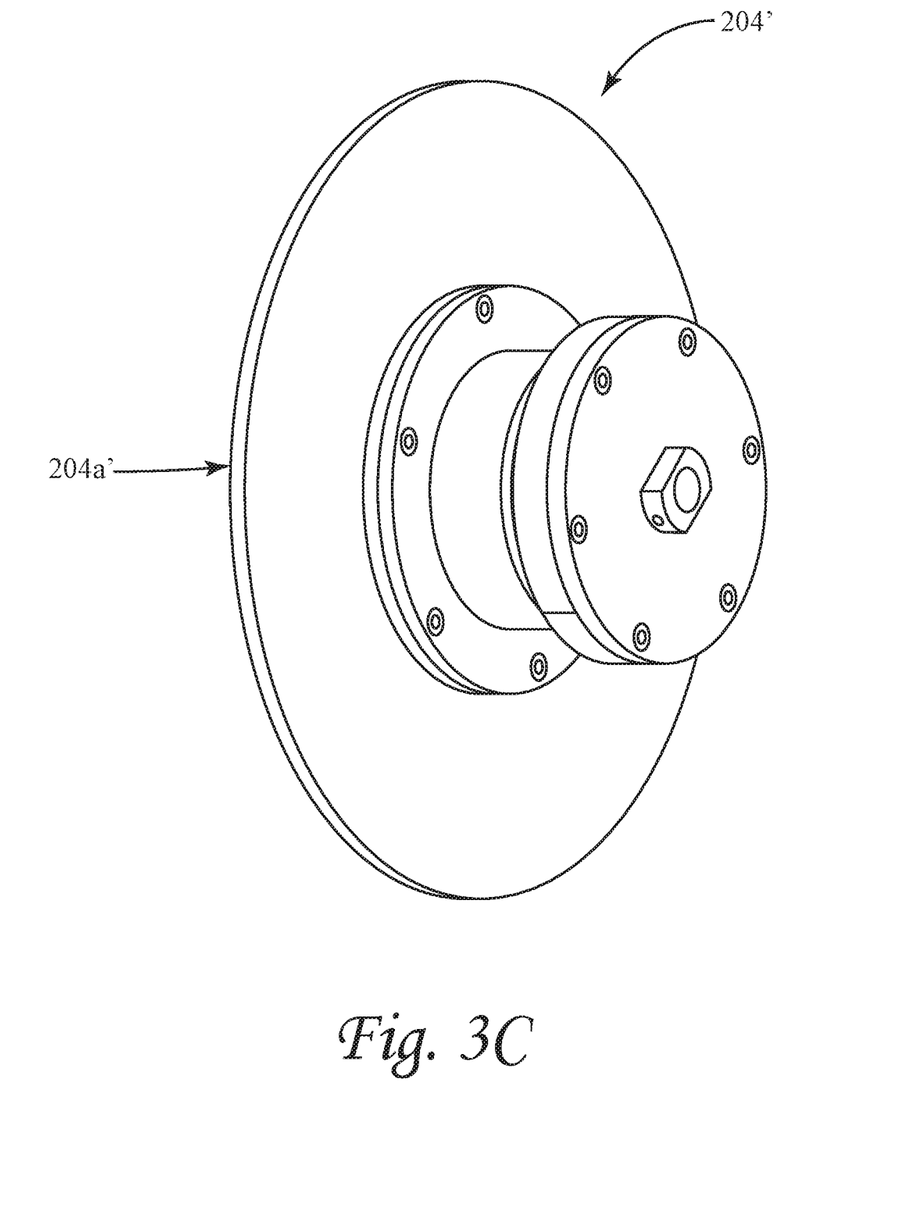
FIG. 3c shows an alternate endform assembly with flat planar endforms.

Turning to FIG. 3b, the second endform assembly 204 includes an endform 204a with a collar 212 mechanically fixed to the center of the endform 204a as shown. The endform 204a shown has a tapered (e.g., convex or frustoconical) inner side (the side facing the mandrel 202 in FIG. 2) and an opposite, tapered (e.g., concave or frustoconical) outer side (the side facing away from the mandrel 202 in FIG. 2). While the endform 204a is shown being tapered, in at least one embodiment of a second endform assembly 204' shown in FIG. 3c, the endform 204a' may have flat inner and outer sides.

The collar 212 has an internal sleeve 212a that is aligned concentrically with a rotation axis C-C as shown. The internal sleeve 212a may be a replaceable wear bushing (e.g., nylon bushing) that can be fixed to the collar 212, such as with a friction or interference fit. The outer part of the collar 212 has a flange 212b that defines a plurality of circumferentially spaced holes 212c, which may be threaded to receive threaded fasteners 310. The internal sleeve 212a defines a cavity (labeled 212e in FIG. 4) which is configured to receive and engage the end 202b of the mandrel 202 when the second endform assembly 204 is connected to the mandrel 202 as described above. In this manner, the rotation axis C-C is aligned with the central rotational axis of the mandrel 202. In the embodiment shown in FIGS. 2 and 3a, the engagement between the internal sleeve 212a and the end 202b of the mandrel 202 is a friction or interference fit that prevents relative rotation along axis C-C between the sleeve 212a and the end 202b when the second endform assembly 204 is connected to the mandrel 202. Alternatively or in addition, in other embodiments, the internal sleeve 212a and end 202b of the mandrel 202 may be engaged through a splined connection. The second endform assembly 204 further includes an outer mount sub-assembly 206 as well as an inner connector sub-assembly 208, which are both positioned on the outer side of the endform 204a (facing away from the mandrel 202 in FIG. 2) relative to the collar 212 as shown.

The inner connector sub-assembly 208 extends coaxially along the rotation axis C-C. The inner connector sub-assembly 208 is mechanically fixed to the flange 212b of the collar 212 and is configured to rotate in unison with the endform 204a. In this configuration, the inner connector sub-assembly 208 also rotates in unison with the mandrel 202 and the first endform assembly 203 when the second endform assembly 204 is connected to the mandrel 202 as described herein.

The mount collar 209 of the moveable arm 205 defines a fixed mounting axis D-D which is preferably parallel to and offset from the rotational axis A-A of the arm 205 as shown in FIG. 2. The outer mount sub-assembly 206 is securely fixed to the mount collar 209 about the fixed mounting axis D-D and is mated to the inner connector sub-assembly 208 during assembly. With the outer mount sub-assembly 206 mated to the inner connector sub-assembly 208, the outer mount sub-assembly 206 provides a bearing support surface for rotation of the inner connector sub-assembly 208 and endform 204a about the rotation axis C-C as described herein. Furthermore, the outer mount sub-assembly 206 and the inner connector sub-assembly 208 are configured to provide a self-centering hub arrangement that can permit and compensate for misalignment of the mounting axis D-D and the rotation axis C-C when connecting the second endform assembly 204 to the mandrel 202 as described herein.

As shown in FIG. 3b, the outer mount sub-assembly 206 includes a support plate 301 and collars 302 that are configured to couple securely together as an assembly. The support plate 301 defines a central mounting hole 301a aligned with the mounting axis D-D as well as a plurality of circumferentially spaced holes 301b about the mounting axis D-D. The central mounting hole 301a is configured to receive a fastener 210 (FIG. 2) that fastens the support plate 301 to the mount collar 209 of the moveable arm 205. The circumferentially spaced holes 301b of the support plate 301 are configured to receive fasteners, such as threaded fasteners 301c, therethrough for engagement with the collars 302. In embodiments, the collars 302 can be semi-circular or "c"-shaped and define a plurality of circumferentially spaced holes to receive and engage the fasteners 301c to secure the collars 302 to the support plate 301. In this configuration, the collars 302 are centered about the mounting axis D-D. The collars 302 mate together to form an annular or ring-like member with an annular recess 304 (FIG. 4) that supports and retains a circular support plate 303.

Figure 4:
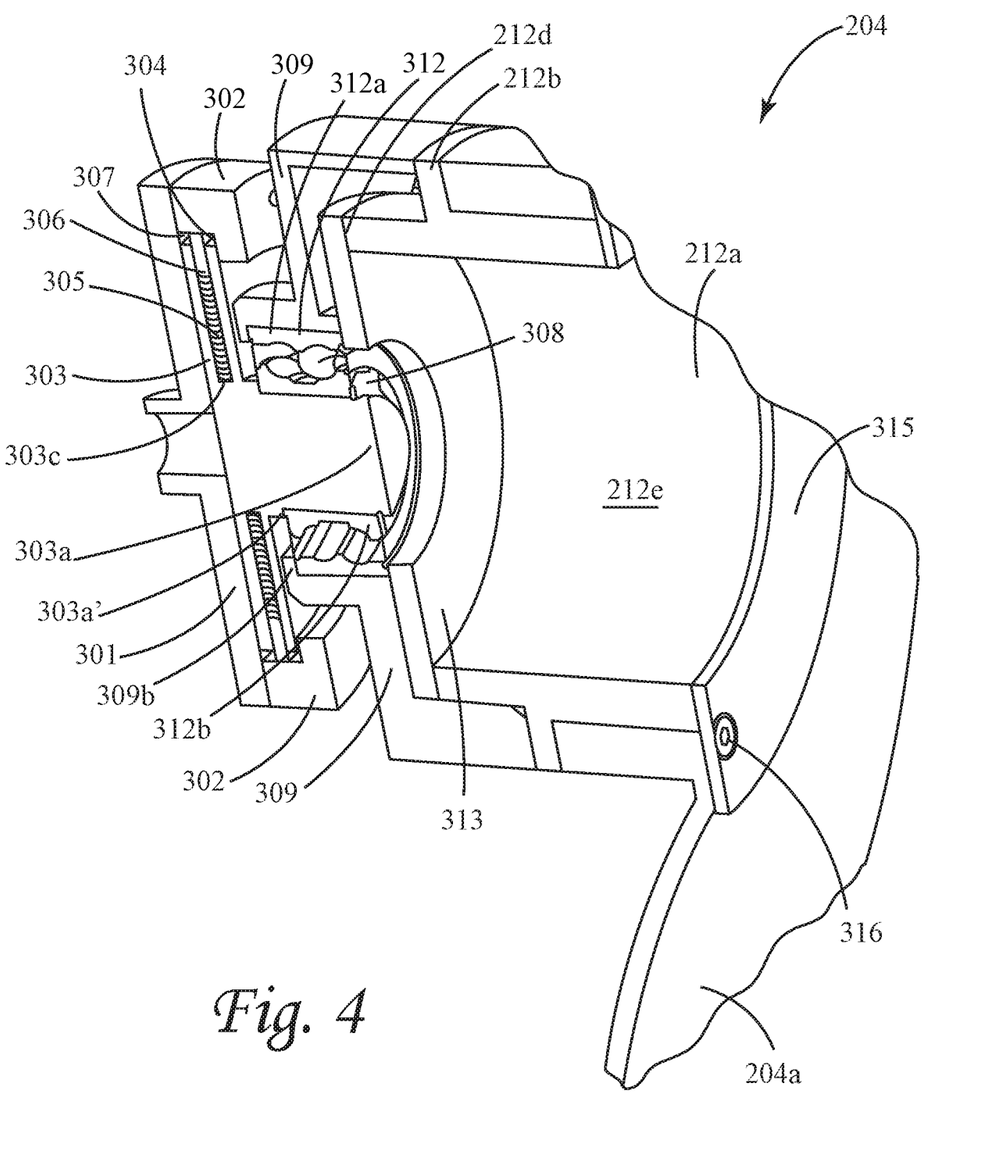
FIG. 4 shows a section view of the removable endform assembly of FIGS. 2, 3a and 3b.

As best shown in FIGS. 3b and 4, the outer diameter of circular support plate 303 is less than the inner diameter of the recess 304 that supports and retains the circular support plate 303. In one embodiment, the difference in such diameters is about 0.25 inches. Thus, when the circular support plate 303 is centered in the collars 302, there can be space between the inner diameter cylindrical surface 307 of the recess 304 and the outer diameter surface of the circular support plate 303. Such space provides a range of radial displacement of the circular support plate 303 relative to the collars 302.

The circular support plate 303 defines radially extending holes or passageways 303c that extend radially inwardly from the outer peripheral edge of the support plate 303. In the embodiment shown in FIG. 3b, the support plate 303 has four holes 303c, which are circumferentially spaced ninety degrees from one another. Each hole 303c at least partially houses a spring 305 and a pin 306. The pin 306 is disposed radially outwardly of the spring 305 in the respective hole 303c. The springs 305 are configured to bias or urge the pins 306 into engagement with the inner cylindrical surface 307 of the recess 304 of the collars 302. The springs 305 and pins 306 can exert forces on the circular support plate 303 that tend to urge the circular support plate 303 into a centered position relative to the collars 302. The circular support plate 303 also includes a central bearing support shaft 303a that extends toward the inner connector sub-assembly 208. The end of the bearing support shaft 303a defines a snap ring slot that receives a snap ring 308 for mating the inner connector sub-assembly 208 about the bearing support shaft 303a.

The inner connector sub-assembly 208 includes a bearing housing 309 that defines an internal sleeve 309a for receiving a bearing 312 (e.g., ball bearing) as shown. The bearing housing 309 is mechanically secured to the flange 212b of the collar 212 by fasteners 310 (such as threaded fasteners) as shown. The bearing 312 interfaces to the bearing support shaft 303a and is retained in this position by a retainer ring 313 and the snap ring 308 that is installed in the snap ring slot of the bearing support shaft 303a.

During operation of the winding machine when the endform 204a and the inner connector sub-assembly 208 are connected to the mandrel 202 and rotate along the rotation axis C-C, the bearing support shaft 303a and the bearing 312 are configured to guide the rotation of the inner connector sub-assembly 208 and the endform 204a. During such rotation, in the event that the outer mount sub-assembly 206 is positioned such that the mounting axis D-D is not aligned with the rotation axis C-C, the springs 305 can undergo compression or tension, depending on their location and the direction of movement of the circular plate 303, thus permitting or accommodating the misalignment of the mounting axis D-D and the rotation axis C-C. Furthermore, the bias action of the springs 305 can generate restoring forces that re-center the circular support plate 303 and thus aligns the mounting axis D-D with the rotation axis C-C during rotation of the inner connector sub-assembly 208 and endform 204a about the rotation axis C-C.

Moreover, the range of radial deflection of the circular support plate 303 relative to the mounting axis D-D permits a certain range of misalignment of the inner connector sub-assembly 208 and endform 204a relative to the outer mount subassembly 206 and the moveable arm 205 when connecting the second endform assembly 204 to the mandrel 202 as described herein. Furthermore, the bias action of the springs 305 can generate restoring forces that re-center the support plate 303 and thus align the mounting axis D-D with the rotation axis C-C when connecting the second endform assembly 204 to the mandrel 202 as described herein.

FIG. 4 shows a section view of the second endform assembly 204 in its assembled configuration. As shown in FIG. 4, the bearing housing 309 has a flange 309b at its outer end which bears against the radially outer portion or ring of the bearing 312. Also, the retainer ring 313 has a radially inner annular edge that bears against the radially outer portion 312a of the bearing 312 and has a radially outer annular edge that bears against a protruding lip 212d of the collar 212, which extends outward from the flange 212b. The radially inner portion 312b or ring of the bearing 312 is retained by a shoulder 303a' formed in the central bearing support shaft 303a and the flange 309b of the bearing housing 309. The snap ring 308 is connected to the central bearing support shaft 303a and retains the opposite side of the bearing 312. When assembled, the endform 204a is fixed to the bearing housing 309 such that the bearing housing 309, collar 212 and endform 204a can rotate in unison about the rotational axis C-C with support from the bearing 312 and the bearing support shaft 303a.

As shown in FIGS. 3b and 4, the inner side of the endform 204a is connected to an annular plate 315, which surrounds the central opening in the endform 204a and is coaxial with the rotational axis C-C. The annular plate 315 can be secured to the endform 204a with a plurality of fasteners 316. The annular plate 315 can be configured to provide wear protection against ends of mandrel forms 202c (FIG. 2) when the second endform assembly 204 is connected to the mandrel 202. The annular plate 315 can also aid in guiding the outer end 202b of the mandrel 202 into the inner sleeve 212b of the second endform assembly 204 when connecting the second endform assembly 204 to the mandrel 202.

The second endform assembly 204 shown in FIG. 4 permits the outer mount sub-assembly 206 to move radially relative to the inner connector sub-assembly 208. Specifically, as noted above, the springs 305 and pins 306 and the annular spacing between the support plate 303 and the collars 302 permit the fixed mounting axis D-D of the outer mount sub-assembly 206 to move radially with respect to the rotational axis C-C of the inner connector sub-assembly 208. Therefore, the mounting axis D-D need not be aligned exactly with the rotational axis C-C (and thus the axis of the mandrel 202) when connecting the second endform assembly 204 to the mandrel 202. Moreover, during the winding operation of the machine when the inner connector sub-assembly 208 and endform 204a rotate in unison with the mandrel 202 about the rotational axis C-C, the bearings 312 will not experience uneven loading even when the mounting axis D-D and the rotational axis C-C are misaligned.

Figures 5A, 5B:
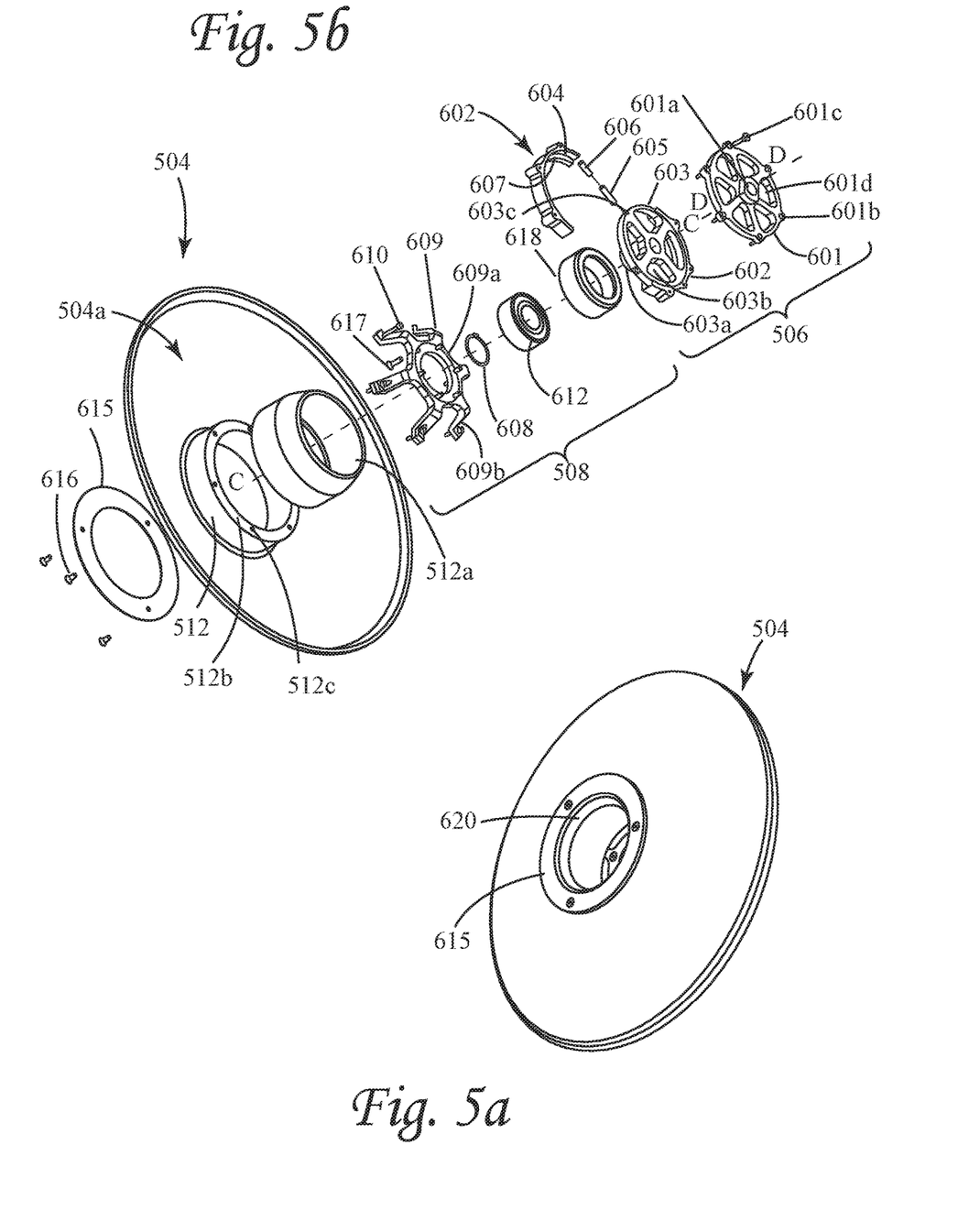
Figure 6:
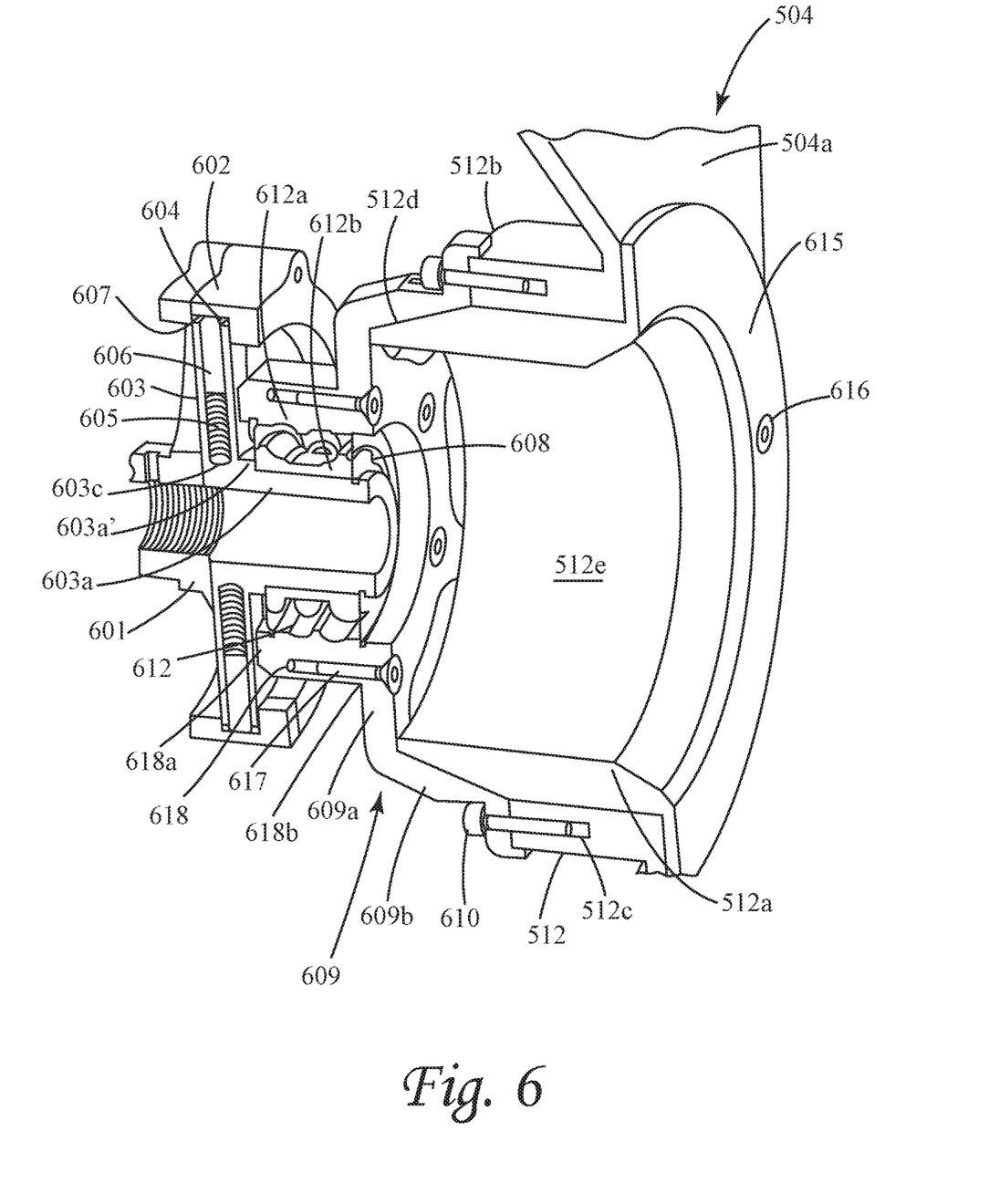
FIG. 6 shows a section view of the removable endform assembly of FIGS. 5a and 5b.

FIGS. 5a, 5b, and 6 show another embodiment of a second endform assembly 504, which can be substituted for second endform assembly 204 in FIG. 2 and used with the first endform assembly 203 to complete wire coiling spool 201 in accordance with an aspect of the disclosure. The second endform assembly 504 functions in the same manner as that of second endform assembly 204. However, the second endform assembly 504 differs structurally from second endform assembly 204 to reduce its mass and weight, as will be appreciated from the following description of second endform assembly 504.

The second endform assembly 504, if substituted for the second endform assembly 204 in FIG. 2, can be removably connected to (and thus can be disconnected from) the mandrel 202 of the winding machine (e.g., machine 100) by operation of the movable arm 205 in the same manner described above with respect to endform assembly 204. For example, in a first position, the second endform assembly 504 is connected to the mandrel 202, and in a second position, the second endform assembly 204 is disconnected from the mandrel 202. Specifically, in the first position, the outer chamfered edge of the second end 202b of the mandrel 202 is received by and engages a cylindrical inner sleeve 512a (which may be a wear bushing, e.g., made of nylon) of the second endform assembly 504 such that the mandrel 202 can drive rotation of the second endform assembly 504 with the rotation of the mandrel 202 and first endform assembly 203 during coil winding operations. When the coil winding operations are complete, the second endform assembly 504 can be moved into a second position where the second endform assembly 504 is disconnected from the mandrel 202 by translating the arm 205 axially (along the axial direction shown by the left hand arrow A in FIG. 2), which moves the second endform assembly 504 coupled to the mount collar 209 of the arm 205 axially parallel to axis A-A and away from the mandrel 202 and separates the mandrel 202 from the inner sleeve 212a of the second endform assembly 504. Furthermore, the entire second end form assembly 504 can be swung out of the way of the mandrel 202 by rotating the arm 205 about axis A-A so that a finished coil of wire (not shown) supported on the mandrel 202 can be unloaded by pulling the coil of wire axially parallel to axis A-A and away from the mandrel 202.

Turning to FIG. 5b, the second endform assembly 504 includes an endform 504a with a collar 512 mechanically fixed to the center of the endform 504a as shown. The endform 504a has a tapered (e.g., convex or frustoconical) inner side (the side facing the mandrel 202 in FIG. 2) and an opposite, tapered (e.g., concave or frustoconical) outer side (the side facing away from the mandrel 202 in FIG. 2). The collar 512 has an internal sleeve 512a that is aligned concentrically with a rotation axis C-C as shown. The outer part of the collar 512 has a flange 512b that defines a plurality of circumferentially spaced holes 512c, which may be threaded to receive threaded fasteners 610. The internal sleeve 512a defines a cavity (labeled 512e in FIG. 6) which is configured to receive and engage the end 202b of the mandrel 202 when the second endform assembly 504 is connected to the mandrel 202 as described above. In this manner, the rotation axis C-C is aligned with the central rotational axis of the mandrel 202.

The internal sleeve 512a may be formed as a wear bushing and may have a lead-in chamfer 620 to guide the end 202b of the mandrel 202 during engagement. The sleeve 512a may be formed of plastic, such as nylon. The engagement between the internal sleeve 512a and the end 202b of the mandrel 202 is a friction or interference fit that prevents relative rotation along axis C-C between the sleeve 512a and the end 202b when the second endform assembly 504 is connected to the mandrel 202. Alternatively or in addition, in other embodiments, the internal sleeve 512a and end 202b of the mandrel 202 may be engaged through a splined or keyed connection. Also, the engagement between the internal sleeve 512a and the outer part of the collar 512 may be a friction or interference fit or a splined connection that prevents relative rotation along axis C-C between the sleeve 512a and the outer part of the collar 512.

The second endform assembly 504 further includes an outer mount sub-assembly 506 as well as an inner connector sub-assembly 508, which are both positioned on the outer side of the endform 504a (facing away from the mandrel 202 in FIG. 2) relative to the collar 512 as shown.

The inner connector sub-assembly 508 extends coaxially along the rotation axis C-C. The inner connector sub-assembly 508 is mechanically fixed to the flange 512b of the collar 512 and is configured to rotate in unison with the endform 504a. In this configuration, the inner connector sub-assembly 508 also rotates in unison with the mandrel 202 and the first endform assembly 203 when the second endform assembly 504 is connected to the mandrel 202 as described herein.

The mount collar 209 of the moveable arm 205 defines a fixed mounting axis D-D which is preferably parallel to and offset from the rotational axis A-A of the arm 205 as shown in FIG. 2. The outer mount sub-assembly 506 is securely fixed to the mount collar 209 about the fixed mounting axis D-D and is mated to the inner connector sub-assembly 508 during assembly. With the outer mount sub-assembly 506 mated to the inner connector sub-assembly 508, the outer mount sub-assembly 506 provides a bearing support surface for rotation of the inner connector sub-assembly 508 and endform 504a about the rotation axis C-C as described herein. Furthermore, the outer mount sub-assembly 506 and the inner connector sub-assembly 508 are configured to provide a self-centering hub arrangement that can permit and compensate for misalignment of the mounting axis D-D and the rotation axis C-C when connecting the second endform assembly 504 to the mandrel 202 as described herein.

As shown in FIG. 5b, the outer mount sub-assembly 506 includes a support plate 601 and collars 602 that are configured to couple securely together as an assembly. The support plate 601 defines a central mounting hole 601a aligned with the mounting axis D-D as well as a plurality of circumferentially spaced holes 601b about the mounting axis D-D. The central mounting hole 601a is configured to receive a fastener 210 (FIG. 2) that fastens the support plate 601 to the mount collar 209 of the moveable arm 205. The circumferentially spaced holes 601b of the support plate 601 are configured to receive fasteners, such as threaded fasteners 601c, therethrough for engagement with the collars 602. The support plate 601 defines a plurality of through openings 601d to reduce mass and weight of the support plate 601.

In embodiments, the collars 602 can be semi-circular or "c"-shaped and define a plurality of circumferentially spaced holes to receive and engage the fasteners 601c to secure the collars 602 to the support plate 601. In this configuration, the collars 602 are centered about the mounting axis D-D. The collars 602 mate together to form an annular or ring-like member with an annular recess 604 (FIGS. 5b and 6) that supports and retains a circular support plate 603.

As best shown in FIGS. 5b and 6, the outer diameter of circular support plate 603 is less than the inner diameter of the recess 604 that supports and retains the circular support plate 603. In one embodiment, the difference in such diameters is about 0.25 inches. Thus, when the circular support plate 603 is centered in the collars 602, there can be space between the inner diameter cylindrical surface 607 of the recess 604 and the outer diameter surface of the circular support plate 603. Such space provides a range of radial displacement of the circular support plate 603 relative to the collars 602.

The circular support plate 603 defines radially extending holes or passageways 603c that extend radially inwardly from the outer peripheral edge of the support plate 603. In the embodiment shown in FIG. 5b, the support plate 603 has four holes 603c, which are circumferentially spaced ninety degrees from one another. Each hole 603c at least partially houses a spring 605 and a pin 606. The pin 606 is disposed radially outwardly of the spring 605 in the respective hole 603c. The springs 605 are configured to bias or urge the pins 606 into engagement with the inner cylindrical surface 607 of the recess 604 of the collars 602. The springs 605 and pins 606 can exert forces on the circular support plate 603 that tend to urge the circular support plate 603 into a centered position relative to the collars 602. The circular support plate 603 also includes a central bearing support shaft 603a that extends toward the inner connector sub-assembly 508. The end of the bearing support shaft 603a defines a snap ring slot that receives a snap ring 608 for mating the inner connector sub-assembly 508 about the bearing support shaft 603a. The support plate 603 defines through holes 603b to reduce mass and weight of the support plate 603.

The inner connector sub-assembly 508 includes a bearing frame 609 and a bearing collar 618 that are configured to connect together with fasteners 617 to capture the bearing 612 therebetween. Bearing 612 is axially retained between the bearing frame 609 and the bearing collar 618. The bearing frame 609 has a central annular platform 609a and plurality of circumferentially spaced legs 609b extending from the platform 609a toward the internal sleeve 512a. The platform 609a is configured to bear against and support a radially outer portion 612a (FIG. 6) of bearing 612 of bearing 612 when the bearing frame 609 is secured to the bearing collar 618.

The bearing support shaft 603a is configured to extend through a central opening of bearing collar 618 and bearing 612. A radially inner portion 612b (FIG. 6) of the bearing 612 is axially positioned on the bearing support shaft 603a between a flange 603a' of the support shaft 603a and the snap ring 608 that is installed in the snap ring slot of the bearing support shaft 603a, as shown in greater detail in FIG. 6. The connection between the support shaft 603a and the radially inner portion 612b of the bearing 612 is such that the support shaft 603a and the radially inner portion 612b of the bearing 612 can rotate in unison together about axis C-C. Moreover, when the bearing frame 609 is secured to the bearing collar 618 with fasteners 617, the radially outer portion 612a of the bearing 612 bears against the bearing collar 618 and the platform 609a of the bearing frame 609, such that the bearing frame 609, bearing collar 618, and the radially outer portion 612a of the bearing 612 are configured to rotate together in unison about axis C-C.

The ends of legs 609b are configured to be mechanically secured to the flange 512b of the collar 512 by fasteners 610 (such as threaded fasteners) as shown. In the embodiment shown in FIG. 5b, the legs 609b extend at a non-zero taper angle with respect to axis C-C so that when the legs 609b are secured to the flange 512b of the collar 512, the legs 609b extend over and conform to a tapered outer edge 512d of inner sleeve 512a, as shown more clearly in FIG. 6. It will be appreciated that the bearing collar 618 and the bearing frame 609 together function in the same manner as the bearing housing 309 and retainer ring 313 of second endform assembly 204. However, the structures of the bearing frame 609 and the bearing collar 618 are formed with less mass and weight than the bearing housing 309 and retainer ring 313.

FIG. 6 shows a section view of the second endform assembly 504 in its assembled configuration. As shown in FIG. 6, the bearing collar 618 has a flange 618a at its outer end which bears against the radially outer portion 612a of the bearing 612. Also, the platform 609a of the bearing frame 609 has a radially inner annular edge that bears against the radially outer portion 612a of the bearing 612, and has a radially outer annular flange that bears against an opposed annular flange 618b of the bearing collar 618. The fasteners 617 connect the annular flange 618b of the bearing collar 618 to radially outer flange of the platform 609a of the bearing frame 609. The radially inner portion 612b of the bearing 612 is axially retained between the shoulder or flange 603a' formed in the central bearing support shaft 603a and the snap ring 308 that is connected to the central bearing support shaft 303a. When assembled, the endform 204a is fixed to the bearing frame 609 such that the bearing frame 609, bearing collar 618, collar 512, and endform 504a can rotate in unison about the rotational axis C-C with support from the bearing 612 and the bearing support shaft 603a.

As shown in FIGS. 5b and 6, the inner side of the endform 504a is connected to an annular plate 615, which surrounds the central opening in the endform 504a and is coaxial with the rotational axis C-C. The annular plate 615 can be secured to the endform 504a with a plurality of fasteners 616. The annular plate 615 can be configured to provide wear protection against ends of mandrel forms 202c (FIG. 2) when the second endform assembly 504 is connected to the mandrel 202. The annular plate 615 can also aid in guiding the outer end 202b of the mandrel 202 into the inner sleeve 512a of the second endform assembly 504 when connecting the second endform assembly 504 to the mandrel 202.

During operation of the winding machine, when the endform 504a and the inner connector sub-assembly 508 are connected to the mandrel 202 and rotate along the rotation axis C-C, the bearing support shaft 603a and the bearing 612 are configured to guide the rotation of the inner connector sub-assembly 508 and the endform 504a. During such rotation, in the event that the outer mount sub-assembly 506 is positioned such that the mounting axis D-D is not aligned with the rotation axis C-C, the springs 605 can undergo compression or tension, depending on their location and the direction of movement of the circular plate 603, thus permitting or accommodating the misalignment of the mounting axis D-D and the rotation axis C-C. Furthermore, the bias action of the springs 605 can generate restoring forces that re-center the circular support plate 603 and thus aligns the mounting axis D-D with the rotation axis C-C during rotation of the inner connector sub-assembly 508 and endform 504a about the rotation axis C-C.

Moreover, the range of radial deflection of the circular support plate 603 relative to the mounting axis D-D permits a certain range of misalignment of the inner connector sub-assembly 508 and endform 504a relative to the outer mount subassembly 506 and the moveable arm 205 when connecting the second endform assembly 504 to the mandrel 202 as described herein. Furthermore, the bias action of the springs 605 can generate restoring forces that re-center the support plate 603 and thus align the mounting axis D-D with the rotation axis C-C when connecting the second endform assembly 504 to the mandrel 202 as described herein.

The second endform assembly 504 shown in FIG. 6 permits the outer mount sub-assembly 506 to move radially relative to the inner connector sub-assembly 508. Specifically, as noted above, the springs 605 and pins 606 and the annular spacing between the support plate 603 and the collars 602 permit the fixed mounting axis D-D of the outer mount sub-assembly 506 to move radially with respect to the rotational axis C-C of the inner connector sub-assembly 508. Therefore, the mounting axis D-D need not be aligned exactly with the rotational axis C-C (and thus the axis of the mandrel 202) when connecting the second endform assembly 504 to the mandrel 202. Moreover, during the winding operation of the machine when the inner connector sub-assembly 508 and endform 504a rotate in unison with the mandrel 202 about the rotational axis C-C, the bearings 612 will not experience uneven loading even when the mounting axis D-D and the rotational axis C-C are misaligned.

There have been described and illustrated herein embodiments of a self-centering endform and mandrel. While particular embodiments have been described, it is not intended that the invention be limited thereto, as it is intended that the invention be as broad in scope as the art will allow and that the specification be read likewise. Thus, while particular biasing members have been disclosed, it will be appreciated that other biasing members may be used as well. In addition, while particular types of springs and bearings have been disclosed, it will be understood that other springs and bearings can be used. It will therefore be appreciated by those skilled in the art that yet other modifications could be made to the provided invention without deviating from its spirit and scope as claimed.

What is claimed is:

1. A spool endform assembly comprising:
   an endform with a central collar that are configured to rotate about a rotational axis; and
   a mount sub-assembly configured to be mounted in a fixed orientation on a mounting structure;
   wherein the spool endform assembly is further configured to permit misalignment of the fixed orientation of the mount sub-assembly relative to the rotational axis of the endform and central collar.

2. A spool endform assembly according to claim 1, wherein:
   the mount sub-assembly includes at least one annular member that is centered about a mounting axis corresponding to the fixed orientation of the mount sub-assembly, wherein the at least one annular member is configured to support and retain a circular plate in a manner that provides a range of radial displacement of the circular plate relative to the at least one annular member.

3. A spool endform assembly according to claim 2, wherein:
   the circular plate is coupled by a connector sub-assembly to the endform and central collar, and the range of radial displacement of the circular plate relative to the at least one annular member permits misalignment of the fixed orientation of the mount sub-assembly relative to the rotational axis of the endform and central collar.

4. A spool endform assembly according to claim 3, wherein:
   the at least one annular member includes a recess that supports and retains the circular plate; and
   the circular plate includes a plurality of radial holes or passageways that each receive a pin and biasing member, wherein the pins and biasing members are configured to maintain contact of the pins with the recess of the at least one annular member and urge alignment of the mounting axis with the rotational axis of the endform and central collar.

5. A spool endform assembly according to claim 4, wherein:
   the plurality of radial holes or passageways are circumferentially spaced equidistantly relative to one another.

6. A spool endform assembly according to claim 2, wherein:
   the circular plate includes a central bearing support shaft that extends from the circular plate toward the central collar for coupling to the central collar.

7. A spool endform assembly according to claim 6, further comprising:
   a bearing that is supported by the central bearing support shaft; and a bearing housing that surrounds the bearing and mates to the central collar to support rotation of the bearing housing, central collar and endform about the rotational axis relative to the central bearing support shaft and the circular plate.

8. A spool endform assembly according to claim 6, further comprising:
a bearing that is supported by the central bearing support shaft; and
an open bearing frame coupled to a bearing collar that capture the bearing and that mate to the central collar to support rotation of the bearing housing, central collar and endform about the rotational axis relative to the central bearing support shaft and the circular plate.

9. A spool endform assembly according to claim 1, wherein:
the mounting structure is a moveable arm.

10. A winding spool comprising:
a mandrel extending longitudinally along a central axis from a first end to a second end;
a first endform assembly connected to the first end of the mandrel;
a second endform assembly configured to removably connect to the second end of the mandrel, wherein the second endform assembly includes an endform with a central collar that are configured to rotate about a rotational axis, and a mount sub-assembly configured to be mounted in a fixed orientation on a mounting structure, wherein the second endform assembly is further configured to permit misalignment of the fixed orientation of the mount sub-assembly relative to the rotational axis of the endform and central collar.

11. A winding spool according to claim 10, wherein:
the mount sub-assembly includes at least one annular member that is centered about a mounting axis corresponding to the fixed orientation of the mount sub-assembly, wherein the at least one annular member is configured to support and retain a circular plate in a manner that provides a range of radial displacement of the circular plate relative to the at least one annular member.

12. A winding spool according to claim 11, wherein:
the circular plate is coupled by a connector sub-assembly to the endform and central collar, and the range of radial displacement of the circular plate relative to the at least one annular member permits misalignment of the fixed orientation of the mount sub-assembly relative to the rotational axis of the endform and central collar.

13. A winding spool according to claim 12, wherein:
the at least one annular member includes a recess that supports and retains the circular plate; and
the circular plate includes a plurality of radial holes or passageways that each receive a pin and biasing member, wherein the pins and biasing members are configured to maintain contact of the pins with the recess of the at least one annular member and urge alignment of the mounting axis with the rotational axis of the endform and central collar.

14. A winding spool according to claim 11, wherein:
the circular plate includes a central bearing support shaft that extends from the circular plate toward the central collar for coupling to the central collar.

15. A winding spool according to claim 14, further comprising:
a bearing that is supported by the central bearing support shaft; and
a bearing housing that surrounds the bearing and mates to the central collar to support rotation of the bearing housing, central collar and endform about the rotational axis relative to the central bearing support shaft and the circular plate.

16. A winding spool according to claim 14, further comprising:
a bearing that is supported by the central bearing support shaft; and
an open bearing frame coupled to a bearing collar that capture the bearing and that mate to the central collar to support rotation of the bearing housing, central collar and endform about the rotational axis relative to the central bearing support shaft and the circular plate.

17. A winding spool assembly according to claim 10, wherein:
the mounting structure is a moveable arm.

18. A wire winding machine comprising:
a rotatable wire winding spool with a mandrel extending longitudinally along a central axis from a first end to a second end, a first endform assembly connected to the first end of the mandrel, and a second endform assembly configured to removably connect to the second end of the mandrel;
wherein the second endform assembly includes an endform with a central collar that are configured to rotate about a rotational axis, and a mount sub-assembly configured to be mounted in a fixed orientation on a mounting structure; and
wherein the second endform assembly is further configured to permit misalignment of the fixed orientation of the mount sub-assembly relative to the rotational axis of the endform and central collar.

19. A wire winding machine according to claim 18, wherein:
the mount sub-assembly includes at least one annular member that is centered about a mounting axis corresponding to the fixed orientation of the mount sub-assembly, wherein the at least one annular member is configured to support and retain a circular plate in a manner that provides a range of radial displacement of the circular plate relative to the at least one annular member.

20. A wire winding machine according to claim 19, wherein:
the circular plate is coupled by a connector sub-assembly to the endform and central collar, and the range of radial displacement of the circular plate relative to the at least one annular member permits misalignment of the fixed orientation of the mount sub-assembly relative to the rotational axis of the endform and central collar.

* * * * *